United States Patent [19]
McClure

[11] 3,938,971
[45] Feb. 17, 1976

[54] BAG FILTER CLEANING DEVICE

[75] Inventor: Kenneth R. McClure, Andover, N.Y.

[73] Assignee: The Air Preheater Company, Inc., Wellsville, N.Y.

[22] Filed: Oct. 7, 1974

[21] Appl. No.: 512,639

[52] U.S. Cl. .................. 55/300; 55/375; 55/379; 55/304
[51] Int. Cl.² ........................................ B01D 46/04
[58] Field of Search ............ 55/271, 272, 283, 300, 55/304, 305, 341, 375, 376, 377, 378, 379; 210/383, 384, 332

[56] References Cited
UNITED STATES PATENTS

| 2,483,690 | 10/1949 | Carlson | 55/379 X |
|---|---|---|---|
| 2,576,310 | 11/1951 | Ruemelin | 55/377 |
| 2,805,731 | 9/1957 | Kron | 55/375 |
| 2,927,659 | 3/1960 | Pabst et al. | 55/377 X |
| 3,224,172 | 12/1965 | Eiben | 55/375 X |
| 3,320,725 | 5/1967 | Foster | 55/283 |
| 3,543,483 | 12/1970 | Sheehan | 55/304 X |
| 3,636,680 | 1/1972 | Seidel | 55/378 X |
| 3,837,151 | 9/1974 | Jensen | 55/341 |

FOREIGN PATENTS OR APPLICATIONS

| 1,274,656 | 1/1961 | France | 55/300 |

Primary Examiner—Frank W. Lutter
Assistant Examiner—David L. Lacey
Attorney, Agent, or Firm—Wayne H. Lang

[57] ABSTRACT

A cleaning arrangement for a bag filter in which the bags thereof are subjected to a reciprocatory motion as effected by an electro-magnetic attraction whereby a collection of dust clinging to the outer surface thereof is jarred free and caused to fall to the bottom of a surrounding filter housing from which it may be removed.

1 Claim, 1 Drawing Figure

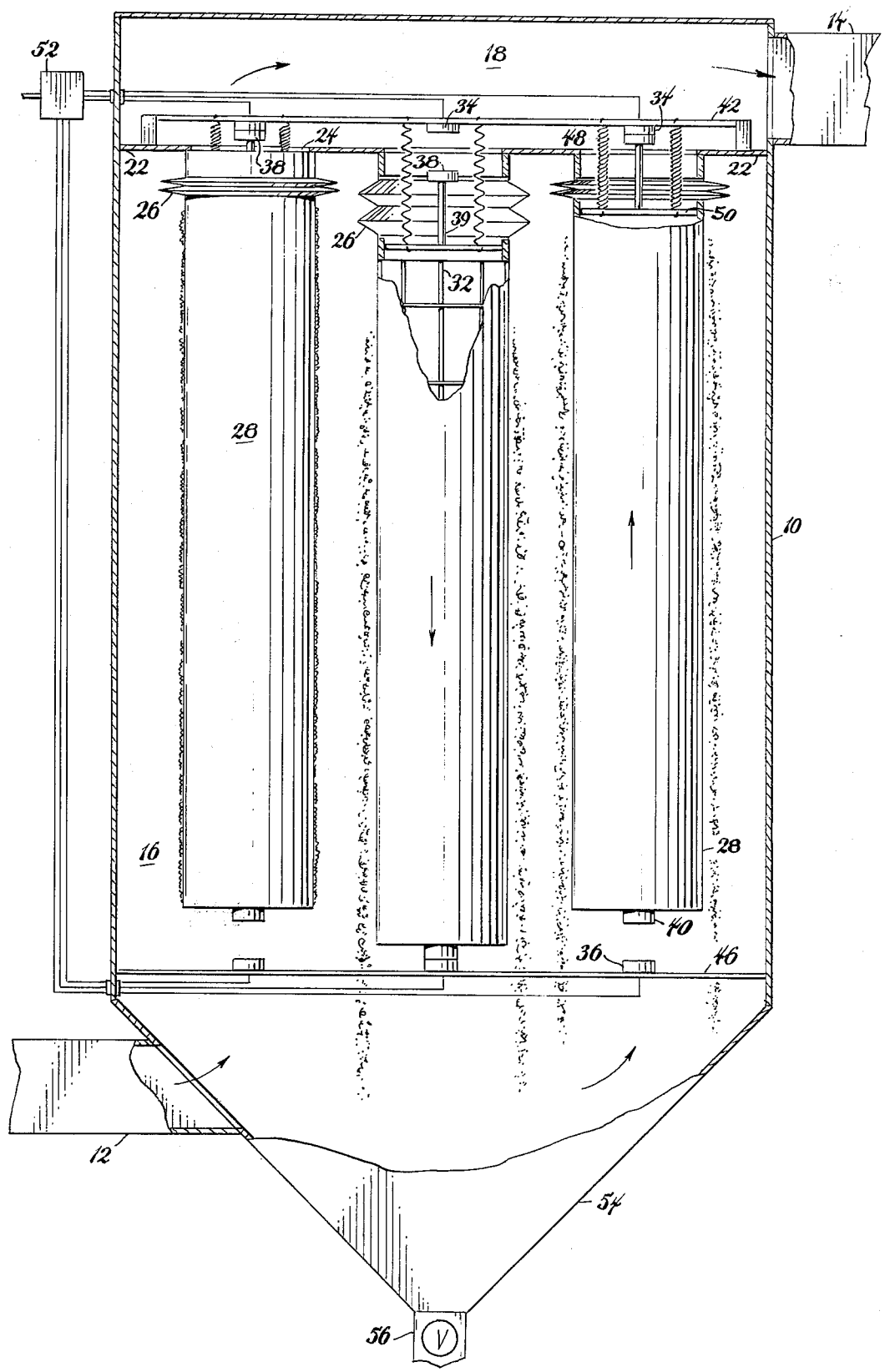

BAG FILTER CLEANING DEVICE

BACKGROUND OF THE INVENTION

This invention relates to filtering devices known as bag filters in which a series of tubular filter bags are positioned across a gas stream to intercept and collect the dust particles therein. As gas passes through the filter and dust particles continue to collect thereon, accumulations of dust must be periodically removed in order that the gas stream passing through the filter will not be retarded by excessive resistance to flow and optimum flow conditions may be maintained.

It is the usual practice to employ one of various rapping, shaking or oscillating devices in which a shaking motion produced by mechanical or pneumatic devices effectively jars the collected dust particles from the filter surface upon which they are deposited and allows them to fall to the bottom of a surrounding filter housing. Examples of this type device are represented by U.S. Pat. No. 3,550,358 of R. V. McCabe and U.S. Pat. No. 2,167,238 of G. A. Geisler.

A mechanical shaking device usually requires the use of an electric motor together with wear prone cams or other linkages to produce a shaking motion that is imparted to the filter bags. A pneumatic shaking device may obviate the usage of certain mechanical linkages, but it does require the use of a pump, motor and costly pneumatic lines so that such a device has equally undesirable attributes.

SUMMARY OF THE INVENTION

This invention therefore has as its general objective the provision of an arrangement which effectively removes collected dust particles from the filter surface of a bag filter device. Moreover, this invention relates to a specific arrangement whereby a reciprocatory motion produced by electro-magnetic action is imparted to a bag filtering device. More importantly, it relates to an arrangement by which an electro-magnetic device having a minimum of electric circuitry is adapted to impart a predetermined shaking or jarring motion to a fabric filter bag sufficient to remove the collected dust particles therefrom.

BRIEF DESCRIPTION OF THE DRAWING

The single FIGURE shows a side elevation of bag filter constructed according to this invention.

DESCRIPTION OF THE PREFERRED EMBODIMENT

The apparatus according to this invention comprises a housing 10 having an inlet 12 for a dust bearing gas and an outlet 14 for the exhaust of clean gas therefrom. The housing is divided into inlet and outlet compartments 16 and 18 by a tube sheet 22 having a series of apertures 24 therein. The apertures 24 are surrounded by an annular bellows or expansion joint 26 that is attached at one end to the tube sheet and at its opposite end to a bag filter 28. The bags are preferably constructed of a woven fabric material and they are fitted tightly around a wire cage 32 or support whereby an elongation of the expansion joint 26 will permit an axial movement of the entire filter bag assembly integrally without stretching, abrading or relative movement of the independent fibers that constitute the fabric of the filter bag.

At each end of the filter bag I provide electro-magnets 34 and 36 that are firmly attached to fixed housing structure while stops 38 and 40 of magnetic material are secured to opposite ends of the support cage 32. The electro-magnets 34 at the open or outlet end of the filter bags 28 are supported by a wire bridge 42 extending diametrically over each of the several apertures of the tube sheet, while axially spaced electro-magnets 36 at the closed end of each bag are supported on means 46 that extends across the housing 10. The magnetic stops 38 at the upper end of each filter bag are mounted on projections 39 that extend axially from a member 50 that extends diametrically across each cage 32 to permit axial movement of the bag filter a distance less than the possible movement of expansion joint 26 whereby abutting contacts will serve as a stop means for the bag when it is being moved axially by the electro-magnetic actuators 34 – 36 on the housing at opposite ends of the filter bag.

A tension spring 48 intermediate the wire bridge 42 and the member 50 at the end of each bag acts as a counter-weight to oppose and thus neutralize the weight of the filter bag 28 after it has been moved down by electro-magnet 36. Thus, as the bag 28 moves down and has been jarred by the contact between the electro-magnet 36 and its stop 40, the accumulation of dust thereon is loosened from the surface of the bag and it is permitted to fall to the bottom of the housing. In as much as tension spring 48 now neutralizes the weight of the bag assembly, a small magnetic force provided by the upper electro-magnet is sufficient to move the entire bag assembly back until stop 38 abuts magnet 34 to complete a full cycle of operation. Any residual accumulation of dust on the outer surface of filter 28 is jarred loose by the abrupt stopping of the bag.

In operation, a flow of dust entrained gas is directed through inlet 12 to inlet chamber 16 of the filter housing. From inlet chamber 16 of the housing the gas flows inward through each filter bag 28, out the open end of the bag to outlet chamber 18 and outlet duct 14 while the dust particles are captured on the outer surface of the filter bag. As the flow of gas continues to pass through the filter, a cake of dust particles removed from the gas stream builds up on the surface of the filter until the flow of gas therethrough is progressively reduced as a result of the increased resistance to gas flow. To periodically remove the dust particles from the surface of the filter and drop them to the hopper 54 where they may be removed through a valving device 56, the filter bags are moved axially against their respective stop means to produce a jarring action that agitates the particles and separates them from the surface of the filter on which they have collected.

A control device 52 actuated either manually or automatically by a timer (not shown) may be set to supply power required to provide any desired frequency, sequence or magnitude of operation to the electro-magnets 34 and 36 at opposite ends of the bag filters. Thus the bags may be slowly or rapidly moved up or down against their respective stop means to produce a distinct jarring action that dislodges the collected dust particles from the surface of the bags, or it may effect a simple vibratory motion that maintains the bags in an essentially dust-free condition.

While a preferred embodiment of the invention has been disclosed, herein, various alterations may be made without departing from the spirit of the invention. The foregoing embodiment should therefore be considered illustrative rather than restrictive of the invention, and the invention is to be limited only by the terms of the following claims.

I claim:

1. Apparatus for filtering solids from gas comprising a housing having an inlet compartment for dust bearing gas and an outlet compartment for clean gas, an apertured tube sheet intermediate said inlet and outlet compartments, an annular expansion joint attached to the tube sheet around each aperture thereof, a cylindrical support cage depending from each expansion joint, a fabric filter bag surrounding each support cage and attached to each annular expansion joint to intercept the dust particles in the dust bearing gas passing therethrough, cleaning means for said filter bags adapted to shake the filter bags to remove collected dust particles therefrom, said cleaning means comprising an electromagnet affixed to said housing at opposite ends of each filter bag, magnetic stop means aligned with each electromagnet and integral with the cage support, spring means attached at opposite ends to the movable support cage and to the fixed housing structure, means for alternately energizing each electromagnet sufficient to axially flex the adjacent expansion joint to reciprocate the filter bag whereby said magnetic stop means abruptly terminates axial movement of each filter bag so as to agitate the dust particles whereby the dust particles may be dislodged from the filter and permitted to fall to the bottom of the filter house when the stop means strikes the electromagnet.

* * * * *